US009636628B2

United States Patent
Higashii et al.

(10) Patent No.: US 9,636,628 B2
(45) Date of Patent: May 2, 2017

(54) AQUEOUS SOLUTION WHICH EFFICIENTLY ABSORBS AND RECOVERS CARBON DIOXIDE IN EXHAUST GAS, AND METHOD FOR RECOVERING CARBON DIOXIDE USING SAME

(71) Applicants: Research Institute of Innovative Technology for the Earth, Kizugawa-shi (JP); Nippon Steel & Sumitomo Metal Corporation, Tokyo (JP)

(72) Inventors: Takayuki Higashii, Kizugawa (JP); Firoz A. Chowdhury, Kizugawa (JP); Kazuya Goto, Kizugawa (JP); Masami Onoda, Tokyo (JP); Yoichi Matsuzaki, Tokyo (JP)

(73) Assignees: Research Institute of Innovative Technology for the Earth, Kizugawa-shi (JP); Nippon Steel & Sumitomo Metal Corporation, Chiyoda-ku (JP)

( * ) Notice: Subject to any disclaimer, the term of this patent is extended or adjusted under 35 U.S.C. 154(b) by 133 days.

(21) Appl. No.: 14/371,264

(22) PCT Filed: Feb. 7, 2013

(86) PCT No.: PCT/JP2013/052860
§ 371 (c)(1),
(2) Date: Jul. 9, 2014

(87) PCT Pub. No.: WO2013/118819
PCT Pub. Date: Aug. 15, 2013

(65) Prior Publication Data
US 2015/0007728 A1 Jan. 8, 2015

(30) Foreign Application Priority Data

Feb. 8, 2012 (JP) ................................ 2012-025170

(51) Int. Cl.
*B01D 53/14* (2006.01)
(52) U.S. Cl.
CPC ..... *B01D 53/1493* (2013.01); *B01D 53/1418* (2013.01); *B01D 53/1425* (2013.01); *B01D 53/1475* (2013.01); *B01D 2252/2041* (2013.01); *B01D 2252/20405* (2013.01); *B01D 2252/20426* (2013.01); *B01D 2252/20431* (2013.01); *B01D 2252/20484* (2013.01); *B01D 2252/504* (2013.01); *B01D 2252/604* (2013.01); *B01D 2252/606* (2013.01); *B01D 2256/24* (2013.01); *B01D 2258/025* (2013.01); *B01D 2258/0233* (2013.01); *B01D 2258/0283* (2013.01); *Y02C 10/06* (2013.01)

(58) Field of Classification Search
CPC ........ B01D 2252/202; B01D 2252/204; B01D 53/1425; B01D 53/1475
See application file for complete search history.

(56) References Cited

U.S. PATENT DOCUMENTS

| 5,618,506 | A | 4/1997 | Suzuki et al. | |
| 5,700,437 | A * | 12/1997 | Fujii | B01D 53/1475 423/220 |
| 6,852,144 | B1 | 2/2005 | Wagner et al. | |
| 2002/0104438 | A1 | 8/2002 | Cadours et al. | |
| 2009/0199709 | A1 * | 8/2009 | Rojey | B01D 53/1425 95/46 |

(Continued)

FOREIGN PATENT DOCUMENTS

| CN | 1127156 A | 7/1996 |
| EP | 0705637 A1 | 4/1996 |

(Continued)

OTHER PUBLICATIONS

H. Lepaumier et al., "Degradation Study of new solvents for CO2 capture in post-combustion," Energy Procedia, 2009, vol. 1, No. 1, pp. 893-900.
International Search Report dated May 14, 2013, issued for PCT/JP2013/052860.
Supplementary European Search Report dated Sep. 2, 2015 for EP Patent Application No. 13746730.4.

(Continued)

*Primary Examiner* — Duane Smith
*Assistant Examiner* — Cabrena Holecek
(74) *Attorney, Agent, or Firm* — Locke Lord LLP; James E. Armstrong, IV; Nicholas J. DiCeglie, Jr.

(57) ABSTRACT

Disclosed is an aqueous solution for absorbing and recovering carbon dioxide from a carbon dioxide-containing gas, the aqueous solution containing an amino alcohol compound represented by Formula 1 and an amine compound represented by Formula 2, $$R-\underset{H}{N}-[\,]_n-OH \qquad \text{Formula 1}$$

wherein R represents an alkyl group having 1 to 5 carbon atoms; and n represents 1 or 2, $$X-[\,]_m-Y \qquad \text{Formula 2}$$

wherein X represents $-NR_1R_2$; Y represents $-NR_3R_4$; R1, R2, R3 and R4 may be the same or different, and each represents an alkyl group having 1 to 3 carbon atoms; and m represents an integer of 3 to 7.

5 Claims, No Drawings

(56) References Cited

U.S. PATENT DOCUMENTS

2011/0176981 A1* 7/2011 Jacquin .............. B01D 53/1493
423/228
2011/0185901 A1 8/2011 Jacquin et al.
2012/0161071 A1 6/2012 Murai et al.
2012/0305840 A1 12/2012 Murai et al.

FOREIGN PATENT DOCUMENTS

| EP | 1872846 A1 | 1/2008 |
|----|------------|--------|
| GB | 1058304 A | 2/1967 |
| GB | 1287194 A | 8/1972 |
| GB | 2001338 A | 1/1979 |
| JP | 2871334 B2 | 3/1999 |
| JP | 2009-006275 A | 1/2009 |
| JP | 2009-529420 A | 8/2009 |
| JP | 2010-110749 A | 5/2010 |
| JP | 2010-188336 A | 9/2010 |
| JP | 2010-201422 A | 9/2010 |
| JP | 2010-536573 A | 12/2010 |
| JP | 2011-528993 A | 12/2011 |
| JP | 2012-143745 A | 8/2012 |
| WO | WO-2009/027491 A1 | 3/2009 |
| WO | WO-2011/036713 A1 | 3/2011 |

OTHER PUBLICATIONS

Office action dated Jun. 17, 2015 for the CN patent application No. 201380008732.9 and English translation thereof.

* cited by examiner

AQUEOUS SOLUTION WHICH EFFICIENTLY ABSORBS AND RECOVERS CARBON DIOXIDE IN EXHAUST GAS, AND METHOD FOR RECOVERING CARBON DIOXIDE USING SAME

TECHNICAL FIELD

The present invention relates to an aqueous solution for absorbing and recovering $CO_2$ contained in a gas, and a method for efficiently absorbing and recovering $CO_2$ contained in a gas by using the aqueous solution.

BACKGROUND ART

In recent years, frequently occurring climate changes and natural disasters, which are seemingly attributable to global warming, have had a significant impact on agricultural production, the living environment, energy consumption, and the like. The global warming is believed to be due to the increase in greenhouse gases, typically $CO_2$, in the atmosphere, resulting from intensive human industrial activities. Therefore, there is an urgent demand for a measure to lower the atmospheric concentrations of $CO_2$.

Major sources of $CO_2$ include thermal power plants, boilers of factories, kilns of cement factories using coal, heavy oil, natural gas, or the like, as a fuel, blast furnaces of ironworks where iron oxide is reduced with coke, and transportation equipment, such as automobiles, marine vessels, aircraft, and the like, using gasoline, heavy oil, light oil or the like, as a fuel. Except for transportation equipment, these sources of $CO_2$ are fixed facilities, and are expected to be easily adapted to implementation measures for reducing $CO_2$ emissions into the atmosphere.

A wide variety of methods for recovering $CO_2$ from gases exhausted from the above-mentioned sources have been studied, and several methods are known.

For example, a method for absorbing $CO_2$ by bringing an aqueous solution of an alkanolamine into contact with a $CO_2$-containing gas in an absorption tower is well known. Examples of known alkanolamines include monoethanolamine (hereinafter, sometimes referred to as "MEA"), diethanolamine (DEA), triethanolamine (TEA), methyldiethanolamine (MDEA), diisopropanolamine (DIPA), and diglycolamine (DGA). MEA is typically used.

However, primary amines, such as MEA, are highly corrosive to device materials, and therefore the use of an aqueous solution of such an alkanolamine as a solution for absorbing $CO_2$ requires the use of expensive, corrosion-resistant steel, or requires lowering the concentration of the amine in the absorbing solution. Further, although absorbed $CO_2$ is typically released and recovered in a regeneration tower by heating the solution to a temperature of about 120° C., this method ends up consuming a large amount of energy for recovery per unit weight $CO_2$ because the use of the above-stated alkanolamines is unsatisfactory in terms of the amount of absorbed $CO_2$ in an absorption tower and the amount of released $CO_2$ in a regeneration tower.

At the present time, where the reduction of $CO_2$ emissions and the saving of energy and natural resources are being sought, a significant amount of energy consumption for the absorption and recovery of $CO_2$ is an obstructive factor to the practical use of the aforementioned technique. Thus, a technique for separating and recovering $CO_2$ with less energy is desired.

As an example of prior art techniques for separating and recovering $CO_2$ by using less energy, Patent Document 1 discloses a method for removing $CO_2$ from a combustion exhaust gas by bringing an aqueous solution of a so-called hindered amine, which has a steric hindrance of alkyl groups or the like around the amino group, into contact with a combustion exhaust gas at atmospheric pressure to allow the aqueous solution to absorb $CO_2$.

In Patent Document 1, 2-methylaminoethanol (hereinafter, sometimes referred to as MAE) and 2-ethylaminoethanol (hereinafter, sometimes referred to as EAE) are described as a hindered amine, and 30 wt % aqueous solutions of MAE and EAE are used in the Examples. Other examples of hindered amines, although not used in the Examples, include amines, such as 2-(isopropylamino)ethanol (hereinafter, sometimes referred to as IPAE).

Patent Documents 2 to 6 disclose absorbing solutions containing N,N,N',N'-tetramethyl-1,3-butanediamine, or N,N,N',N'-tetramethylhexane-1,6-diamine, and methods for removing $CO_2$ by using the absorbing solutions.

CITATION LIST

Patent Documents

Patent Document 1: Japanese Patent No. 2871334
Patent Document 2: JP2009-529420A
Patent Document 3: JP2010-110749A
Patent Document 4: JP2010-188336A
Patent Document 5: JP2010-201422A
Patent Document 6: JP2011-528993A

SUMMARY OF INVENTION

Technical Problem

As noted above, a $CO_2$-absorbing solution that consumes a small amount of energy and has low corrosiveness has been desired for the separation and recovery of $CO_2$.

Accordingly, an object of the present invention is to provide an aqueous solution and a method for not only highly efficiently absorbing $CO_2$ in a gas but also highly efficiently releasing $CO_2$ to recover high-purity $CO_2$ with low energy consumption. Specifically, an object of the present invention is to provide an aqueous solution useful for recovering high-purity $CO_2$ by efficiently absorbing and releasing $CO_2$, namely, with a large amount of $CO_2$ absorption and release per unit amount of the aqueous solution, while requiring low energy for releasing $CO_2$, and to provide a method for absorbing and recovering $CO_2$ using the aqueous solution.

Solution to Problem

The present inventors conducted extensive research on absorbing solutions capable of efficiently absorbing and releasing $CO_2$ to recover high-purity $CO_2$. Consequently, the inventors found that an aqueous solution containing an amino alcohol compound represented by Formula 1 and an amine compound represented by Formula 2 absorbs and releases a large amount of $CO_2$ while exhibiting an excellent absorption rate, thereby significantly increasing the amount of $CO_2$ recovered per unit amount of absorbing solution in one cycle of absorption and release, and that the recovery of $CO_2$ with lower energy consumption becomes possible. Accordingly, the inventors completed the present invention.

Specifically, the present invention is defined by the following Items 1 to 5.

Item 1. An aqueous solution for absorbing and recovering carbon dioxide from a carbon dioxide-containing gas, the aqueous solution comprising an amino alcohol compound represented by Formula 1 and an amine compound represented by Formula 2,

[Chem. 1]

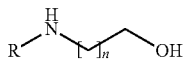

Formula 1 wherein R represents an alkyl group having 1 to 5 carbon atoms, and n represents 1 or 2,

[Chem. 2]

Formula 2 wherein X represents —NR1R2; Y represents —NR3R4; R1, R2, R3 and R4 may be the same or different, and each represents an alkyl group having 1 to 3 carbon atoms; and m represents an integer of 3 to 7.

Item 2. The aqueous solution according to Item 1 wherein the amino alcohol compound and the amine compound have a total concentration of 20 to 80% by weight; the amino alcohol compound has a concentration of 10 to 70% by weight; and the amine compound has a concentration of 1 to 50% by weight.

Item 3. The aqueous solution according to Item 2 wherein the amino alcohol compound has a concentration of 30 to 60% by weight; and the amine compound has a concentration of 1 to 40% by weight.

Item 4 The aqueous solution according to any one of Items 1 to 3 wherein R of the amino alcohol compound represents an alkyl group having 2 to 4 carbon atoms; and m of the amine compound represents an integer of 5 to 7.

Item 5. A method for absorbing and recovering carbon dioxide, the method comprising the steps of:
  (1) bringing the aqueous solution according to any one of Items 1 to 4 into contact with a carbon dioxide-containing gas to absorb carbon dioxide from the gas; and
  (2) heating the aqueous solution obtained in step (1) containing absorbed carbon dioxide therein to release the carbon dioxide, thereby recovering the carbon dioxide.

Advantageous Effects of Invention

The separation and recovery of $CO_2$ with the use of the aqueous solution according to the present invention enables an increase in the amount of $CO_2$ recovered per cycle of $CO_2$ absorption and release, and requires less energy for separation and recovery of $CO_2$ per unit weight of the aqueous solution, thereby efficiently recovering high-purity $CO_2$ with low energy consumption. Furthermore, this leads to a decrease in the amount of circulation flow throughout the absorption-release cycle, thereby making it possible to downsize the absorption tower, release tower, and other associated devices.

MEA, which is widely used, is highly corrosive to carbon steel, and is believed to become more corrosive particularly at high concentrations. On the other hand, the aqueous solution used in the present invention is less corrosive, and is advantageous in that it does not require the use of expensive, high-grade, corrosion-resistant steel.

DESCRIPTION OF EMBODIMENTS

The following describes the present invention in detail.
Aqueous Solution for Absorbing and Recovering Carbon Dioxide The aqueous solution for absorbing and recovering $CO_2$ from a $CO_2$-containing gas according to the present invention contains an amino alcohol compound represented by Formula 1 and an amine compound represented by Formula 2,

[Chem. 3]

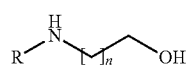

Formula 1 wherein R represents an alkyl group having 1 to 5 carbon atoms, and n represents 1 or 2,

[Chem. 4]

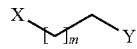

Formula 2 wherein X represents —NR1R2; Y represents —NR3R4; R1, R2, R3 and R4 may be the same or different, and each represents an alkyl group having 1 to 3 carbon atoms; and m represents an integer of 3 to 7.

The alkyl group having 1 to 5 carbon atoms may be linear or branched, and examples thereof include methyl, ethyl, n-propyl, isopropyl, n-butyl, isobutyl, sec-butyl, n-pentyl, and isopentyl. Preferably, R is an alkyl group having 2 to 4 carbon atoms, and examples thereof include ethyl, n-propyl, isopropyl, n-butyl, and isobutyl, with isopropyl, n-butyl, and isobutyl being more preferable.

The alkyl group having 1 to 3 carbon atoms may be linear or branched, and examples thereof include methyl, ethyl, n-propyl, and isopropyl. Preferably, R1, R2, R3, and R4 are methyl or ethyl.

Preferably, m is 5 to 7, with 5 being more preferable.

Examples of the amino alcohol compound represented by Formula 1 include N-ethylethanolamine, N-n-propylethanolamine, N-isopropylethanolamine, N-n-butylethanolamine, N-isobutylethanolamine, 3-ethylamino-1-propanol, 3-n-propylamino-1-propanol, 3-isopropylamino-1-propanol, 3-n-butylamino-1-propanol, and 3-isobutylamino-1-propanol. These can be used in industrial applications.

Examples of the amine compound represented by Formula 2 include N,N,N',N'-tetramethyl-1,4-butanediamine, N,N,N',N'-tetramethyl-1,5-pentanediamine, N,N,N',N'-tetramethyl-1,6-hexanediamine, N,N,N',N'-tetramethyl-1,8-octanediamine, N,N,N',N'-tetraethyl-1,4-butanediamine, N,N,N',N'-tetraethyl-1,5-pentanediamine, N,N,N',N'-tetraethyl-1,6-hexanediamine, and N,N,N',N'-tetraethyl-1,8-octanediamine. These can be used in industrial applications.

The amino alcohol compound represented by Formula 1 and the amine compound represented by Formula 2 preferably have a total concentration of 20 to 80% by weight; the amino alcohol compound represented by Formula 1 preferably has a concentration of 10 to 70% by weight; and the amine compound represented by Formula 2 preferably has a concentration of 1 to 50% by weight. The amino alcohol compound represented by Formula 1 more preferably has a concentration of 30 to 60% by weight, and the amine compound represented by Formula 2 more preferably has a concentration of 1 to 40% by weight.

If desired, the aqueous solution according to the present invention may contain a stabilizer (e.g., an antioxidant) to ensure the chemical or physical stability of the aqueous solution, or an inhibitor (e.g., a corrosion inhibitor) to prevent the deterioration of the materials of devices and equipment in which the aqueous solution of the present invention is used.

The amino alcohol compound represented by Formula 1 and the amine compound represented by Formula 2 are commercially available, or are produced by known methods.

Examples of the $CO_2$-containing gas include: exhaust gases from thermal power plants, boilers of factories, kilns of cement factories using coal, heavy oil, natural gas or the like as a fuel, blast furnaces of ironworks where iron oxide is reduced with coke, converter furnaces of steel mills where carbon in pig iron is combusted to produce steel, integrated coal gasification combined cycle facilities, and the like; raw natural gases; and reformed gases. The gases typically have a concentration of $CO_2$ in the range of about 5 to 30 vol %, and particularly about 6 to 25 vol %. When the concentration of $CO_2$ is within such a range, the effect of the present invention is advantageously produced. The $CO_2$-containing gas may contain, in addition to $CO_2$, gases such as water vapor, CO, $H_2S$, COS, $SO_2$, $NO_2$, hydrogen, and the like.

Method for Absorbing and Recovering Carbon Dioxide

The method for absorbing and recovering $CO_2$ according to the present invention includes the following steps:
(1) bringing the above-described aqueous solution into contact with a $CO_2$-containing gas to absorb $CO_2$ from the gas; and
(2) heating the aqueous solution obtained in step (1) containing absorbed $CO_2$ therein to release and recover $CO_2$.

Step of Absorbing Carbon Dioxide

The method according to the present invention includes the step of bringing the above-described aqueous solution into contact with a $CO_2$-containing gas to absorb $CO_2$ from the gas. The method for bringing the aqueous solution of the present invention into contact with a $CO_2$-containing gas to absorb $CO_2$ is not particularly limited. Examples include a method comprising bubbling a $CO_2$-containing gas in the aqueous solution to absorb $CO_2$, a method comprising mist-spraying the aqueous solution over a $CO_2$-containing gas stream (misting or spraying method), or a method comprising bringing the aqueous solution into countercurrent contact with a $CO_2$-containing gas in an absorption tower that contains a porcelain or metal mesh filler.

A $CO_2$-containing gas is absorbed into the aqueous solution at a temperature typically in the range of from room temperature to 60° C., preferably 50° C. or less, and more preferably in the range of about 20 to 45° C. The lower the temperature, the larger the absorption amount. However, how far the temperature should be lowered is determined in accordance with the gas temperature of the exhaust gas, the heat recovery target, or the like. Carbon dioxide is typically absorbed at atmospheric pressure. Although it is possible to increase the pressure to a higher level in order to improve the absorption capacity, it is preferable to effect absorption at atmospheric pressure to suppress the energy consumption required for compression.

The $CO_2$-containing gas is the same as the aforementioned gas.

Step of Releasing Carbon Dioxide

The method according to the present invention includes the step of heating the aqueous solution obtained in the step of absorbing $CO_2$ to thereby release and recover $CO_2$.

Examples of methods for recovering pure or high-concentration $CO_2$ by releasing $CO_2$ from an aqueous solution containing absorbed $CO_2$ therein include a method comprising heating and boiling the aqueous solution in a vessel as in distillation, and a method comprising heating the aqueous solution in a plate distillation column, spray tower, or release tower containing a porcelain or metal mesh filler to increase the liquid contact interface. $CO_2$ is thereby liberated and released from bicarbonate ions.

$CO_2$ is released at a solution temperature of typically 70° C. or more, preferably 80° C. or more, and more preferably about 90 to 120° C. The higher the temperature, the larger the absorption amount; however, an increase in temperature results in an increase in energy necessary for heating the absorbing solution. Therefore, the temperature is determined in accordance with the gas temperature during the process, the heat recovery target, or the like. The amine aqueous solution from which $CO_2$ has been released is again sent to the $CO_2$-absorbing step to recycle it. During this period, the heat applied in the $CO_2$-releasing step is effectively used in the recycling process to increase the temperature of an aqueous solution that is to be sent to the $CO_2$-releasing step through heat exchange, thereby resulting in the reduction of energy consumption in the entire recovery process.

The thus recovered $CO_2$ has a purity of typically 99 vol % or more, which means that it is extremely pure and can be used in the chemical industry or food industry. Further, the recovered $CO_2$ can also be stored underground for EOR (Enhanced Oil Recovery) or CCS, which are presently being considered for practical use.

EXAMPLES

The following Examples describe the present invention in detail. However, the present invention is not limited to the Examples.

Example 1

A glass-made gas washing bottle was immersed into a constant temperature water bath whose liquid temperature was set at 40° C. This bottle was filled with 50 g of an aqueous solution containing 50 wt % of 2-(isopropylamino)ethanol (IPAE, manufactured by Tokyo Chemical Industry Co., Ltd.) and 10 wt % of N,N,N',N'-tetramethyl-1,6-hexanediamine (TMHA, manufactured by Tokyo Chemical Industry Co., Ltd.). Into the aqueous solution, a gas mixture of 20 vol % of carbon dioxide and 80 vol % of nitrogen was introduced at a rate of 0.7 L/min at atmospheric pressure through a glass filter having a pore size of 100 μm and a diameter of 13 mm to disperse the gas in the form of bubbles and effect absorption for 60 minutes.

The $CO_2$ concentration in the gas was continuously measured at the inlet and outlet of the absorbing solution using an infrared carbon dioxide meter (HORIBA GAS ANALYZER VA-3000), and the amount of absorbed $CO_2$ was determined from the difference in the flow amount of $CO_2$ between the inlet and the outlet. Where necessary, the amount of inorganic carbon in the absorbing solution was measured with a total organic carbon analyzer for gas chromatography (SHIMADZU TOC-VCSH), and compared with the value obtained by using the infrared carbon dioxide meter. The saturated absorption amount is defined as the amount of $CO_2$ absorbed until the $CO_2$ concentration at the outlet of the absorbing solution became equal to that at the inlet. Because the absorption rate varies depending on the absorption amount, the absorption rate at the time point at which $CO_2$ was absorbed in an amount equal to ½ of the saturated absorption amount was measured and compared. Subsequently, the temperature of the solution was increased to 70° C. over a few minutes in the same gas stream, and the amount of released $CO_2$ was measured for 60 minutes under the same conditions.

The quantity of heat generation was determined by diffusing at 40° C. a predetermined amount of $CO_2$ into one of the reactors of two absorption devices of the same shape, each of which was equipped with a stirrer, and measuring, during this period, the difference in the quantity of generated heat between the two reactors using a differential calorimeter (DRC Evolution manufactured by SETARAM).

Examples 2 to 5

Following the procedure of Example 1 and using an aqueous solution containing IPE and TMHA at the concentrations shown in Table 1 in place of the aqueous solution containing 50 wt % of IPAE and 10 wt % of TMHA, the saturated absorption amount, absorption rate, quantity of heat generation, and released amount of $CO_2$ were measured.

Example 6

Following the procedure of Example 1 and using an aqueous solution containing 3-isopropylamino-1-propanol (IPAP) and TMHA at the concentrations shown in Table 2 in place of the aqueous solution containing 50 wt % of IPAE and 10 wt % of TMHA, the saturated absorption amount, absorption rate, quantity of heat generation, and released amount of $CO_2$ were measured.

Examples 7 to 9

Following the procedure of Example 1 and using an aqueous solution containing IPAP and TMHA at the concentrations shown in Table 1 in place of the aqueous solution containing 50 wt % of IPAE and 10 wt % of TMHA, the saturated absorption amount, absorption rate, and released amount of $CO_2$ were measured.

Examples 10 to 12

Following the procedure of Example 1 and using an aqueous solution containing 2-ethylamino-1-ethanol (EAE) and TMHA at the concentrations shown in Table 1 in place of the aqueous solution containing 50 wt % of IPAE and 10 wt % of TMHA, the saturated absorption amount, absorption rate, and released amount of $CO_2$ were measured.

EAE is readily available commercially and is inexpensive as compared with IPAE; thus, EAE is advantageous in terms of the cost of absorbing solutions. As is apparent from the comparison with Comparative Examples 8 and 9, even when using EAE, the addition of the amine compound according to the present invention significantly increases the amount of $CO_2$ released, which is a very important property or absorbing solutions.

Examples 13 to 15

Following the procedure of Example 1 and using an aqueous solution containing IPAE and N,N,N',N'-tetramethyl-1,4-butanediamine (TMBA, manufactured by Tokyo Chemical Industry Co., Ltd.) in place of the aqueous solution containing IPAE and TMHA, the saturated absorption amount and released amount of $CO_2$ were measured. The results revealed that the saturated absorption amount and released amount of $CO_2$ per unit amount of the absorbing solution were improved as compared with the use of an aqueous solution containing only IPAE.

Comparative Examples 1 to 3

Following the procedure of Example 1 and using aqueous solutions individually containing 30, 55, and 60 wt % of IPAE only in place of the aqueous solution containing 50 wt % of IPAE and 10 wt % of TMHA, the saturated absorption amount, absorption rate, quantity of heat generation, and released amount of $CO_2$ were measured.

Comparative Example 4

Following the procedure of Example 1 and using an aqueous solution containing 52 wt % of IPAE and 3 wt % of piperazine (PZ) in place of the aqueous solution containing 50 wt % of IPAE and 10 wt % of TMHA, the saturated absorption amount, absorption rate, quantity of heat generation, and released amount of $CO_2$ were measured.

Comparative Examples 5 and 6

Following the procedure of Example 1 and using aqueous solutions individually containing 30 wt % and 50 wt % of TMHA in place of the aqueous solution containing 50 wt % of IPAE and 10 wt % of TMHA, the saturated absorption amount, absorption rate, quantity of heat generation, and released amount of $CO_2$ were measured.

Comparative Example 7

Following the procedure of Example 1 and using an aqueous solution containing 30 wt % of IPAP in place of the aqueous solution containing 50 wt % of IPAP and 10 wt % of TMHA, the saturated absorption amount, and released amount of $CO_2$ were measured.

Comparative Examples 8 and 9

Following the procedure of Example 1 and using aqueous solutions individually containing 30 wt % and 54 wt % of EAE in place of the aqueous solution containing 50 wt % of EAE and 10 wt % of TMHA, the saturated absorption amount, and released amount of $CO_2$ were measured.

Table 1 shows the results of Examples 1 to 15 and Comparative Examples of 1 to 9. The symbol "%" used in Table 1 denotes "wt %."

TABLE 1

| | Composition of Aqueous Solution (by Weight) | | | | CO$_2$ Absorption Performance at 40° C. | | | CO$_2$ Release Performance at 70° C. Released Amount (g/kg Aqueous Solution) |
|---|---|---|---|---|---|---|---|---|
| | | | | | CO$_2$ Saturated Absorption Amount (g/kg Aqueous Solution) | CO$_2$ Absorption Rate (g/kg/min) | Quantity of Heat Generation (kj/mol CO$_2$) | |
| | Compound 1 | | Compound 2 | | | | | |
| Example 1 | IPAE | 50% | TMHA | 10% | 156 | 4.6 | 65.0 | 91 |
| Example 2 | IPAE | 55% | TMHA | 15% | 132 | 4.0 | — | 91 |
| Example 3 | IPAE | 40% | TMHA | 5% | 146 | 5.0 | 67.6 | 68 |
| Example 4 | IPAE | 20% | TMHA | 30% | 121 | 4.5 | — | 77 |
| Example 5 | IPAP | 53% | TMHA | 2% | 154 | 4.1 | 76.6 | 84 |
| Example 6 | IPAP | 50% | TMHA | 1% | 146 | 5.0 | 70.8 | 54 |
| Example 7 | IPAP | 50% | TMHA | 10% | 148 | 3.2 | — | 56 |
| Example 8 | IPAP | 45% | TMHA | 7.5% | 147 | 3.0 | — | 55 |
| Example 9 | IPAP | 35% | TMHA | 20% | 138 | 4.3 | — | 63 |
| Example 10 | EAE | 50% | TMHA | 10% | 157 | 5.2 | — | 30 |
| Example 11 | EAE | 45% | TMHA | 7.5% | 149 | 5.3 | — | 34 |
| Example 12 | EAE | 35% | TMHA | 20% | 156 | 5.1 | — | 42 |
| Example 13 | IPAE | 60% | TMBA | 10% | 150 | 3.5 | — | 85 |
| Example 14 | IPAE | 45% | TMBA | 7.5% | 148 | 4.2 | — | 80 |
| Example 15 | IPAE | 40% | TMBA | 5% | 143 | 4.8 | — | 69 |
| Comp. Ex 1 | IPAE | 30% | — | | 98.6 | 5.0 | 76.6 | 35 |
| Comp. Ex 2 | IPAE | 55% | — | | 100.0 | 3.2 | 72.8 | 32 |
| Comp. Ex 3 | IPAE | 60% | — | | 100.6 | 2.9 | 71.5 | 29 |
| Comp. Ex 4 | IPAE | 52% | PZ | 3% | 136.2 | 4.6 | 76.2 | 48 |
| Comp. Ex 5 | — | | TMHA | 30% | 73 | 3.8 | 67.2 | 13 |
| Comp. Ex 6 | — | | TMHA | 50% | 102 | 2.2 | — | 36 |
| Comp. Ex 7 | IPAP | 30% | — | | 98 | — | — | 19 |
| Comp. Ex 8 | EAE | 30% | — | | 102 | — | — | 21 |
| Comp. Ex 9 | EAE | 54% | — | | 150 | — | — | 23 |

Results of Example 1

The saturated absorption amount of CO$_2$ was 156 g per kg of the aqueous solution at a temperature of 40° C. The released amount of CO$_2$ was 91 g per kg of the absorbing solution at a temperature of 70° C. The recovered CO$_2$ had a purity of 99.8%. The results revealed that the saturated absorption amount and released amount per unit amount of the absorbing solution were significantly larger than those of Comparative Example 1. Thus, the performance of the absorbing solution of the present invention was recognized.

Results of Comparative Examples 1 to 3

The absorption rate was high at a low concentration of 30 wt %; however, a significant decrease in the absorption rate was observed at a concentration of 60 wt %. All of the solutions of Comparative Examples 1 to 3 exhibited a lower saturated absorption amount and released amount than those of Examples 1 to 5.

Results of Comparative Example 4

Piperazine is known as a reaction activator for the absorption of CO$_2$ by using an alkanolamine aqueous solution, and exerts an improving effect on the saturated absorption amount and absorption rate. The results shown in Table 1 reveal that the solutions of Examples 1 to 5 are advantageous in terms of the released amount.

Results of Comparative Examples 5 and 6

The aqueous solutions containing only TMHA did not exert a sufficient effect on the released amount at a concentration of 30 wt %. The absorption rate was considerably decreased at a concentration of 50 wt %. The results shown in Table 1 reveal that the solutions of the Examples were advantageous.

Results of Comparative Example 7

The released amount was smaller than that of Examples 6 to 9.

Results of Comparative Examples 8 and 9

The solutions of Comparative Examples 8 and 9 both exhibited smaller released amounts than those of Examples 10 to 12.

Test Example 1

The aqueous solution of Example 1 was tested for corrosion of an SS400 metal test piece. The test was conducted using a Hastelloy autoclave under a CO$_2$-saturated atmosphere at 130° C. for 48 hours. As a result, the corrosion caused by the aqueous solution of Example 1 on the SS400 was total corrosion, and the calculated corrosion rate was 0.13 mm/year. The results revealed that the aqueous solution of Example 1 is slightly corrosive.

The invention claimed is:

1. An aqueous solution for absorbing and recovering carbon dioxide from a carbon dioxide-containing gas, the aqueous solution comprising an amino alcohol compound represented by Formula 1 and an amine compound represented by Formula 2,

[Chem. 1]

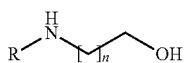

Formula 1 wherein R represents an alkyl group having 1 to 5 carbon atoms, and n represents 1 or 2,

[Chem. 2]

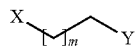

Formula 2 wherein X represents —NR1R2; Y represents —NR3R4; R1, R2, R3 and R4 may be the same or different, and each represents an alkyl group having 1 to 3 carbon atoms; and m represents an integer of 3 to 7.

2. The aqueous solution according to claim 1 wherein the amino alcohol compound and the amine compound have a total concentration of 20 to 80% by weight; the amino alcohol compound has a concentration of 10 to 70% by weight; and the amine compound has a concentration of 1 to 50% by weight.

3. The aqueous solution according to claim 2 wherein the amino alcohol compound has a concentration of 30 to 60% by weight; and the amine compound has a concentration of 1 to 40% by weight.

4. The aqueous solution according to claim 1 wherein R of the amino alcohol compound represents an alkyl group having 2 to 4 carbon atoms; and m of the amine compound represents an integer of 5 to 7.

5. A method for absorbing and recovering carbon dioxide, the method comprising the steps of:
(1) bringing the aqueous solution according to claim 1 into contact with a carbon dioxide-containing gas to absorb carbon dioxide from the gas; and
(2) heating the aqueous solution obtained in step (I) containing absorbed carbon dioxide therein to release the carbon dioxide, thereby recovering the carbon dioxide.

* * * * *